Figure 1:
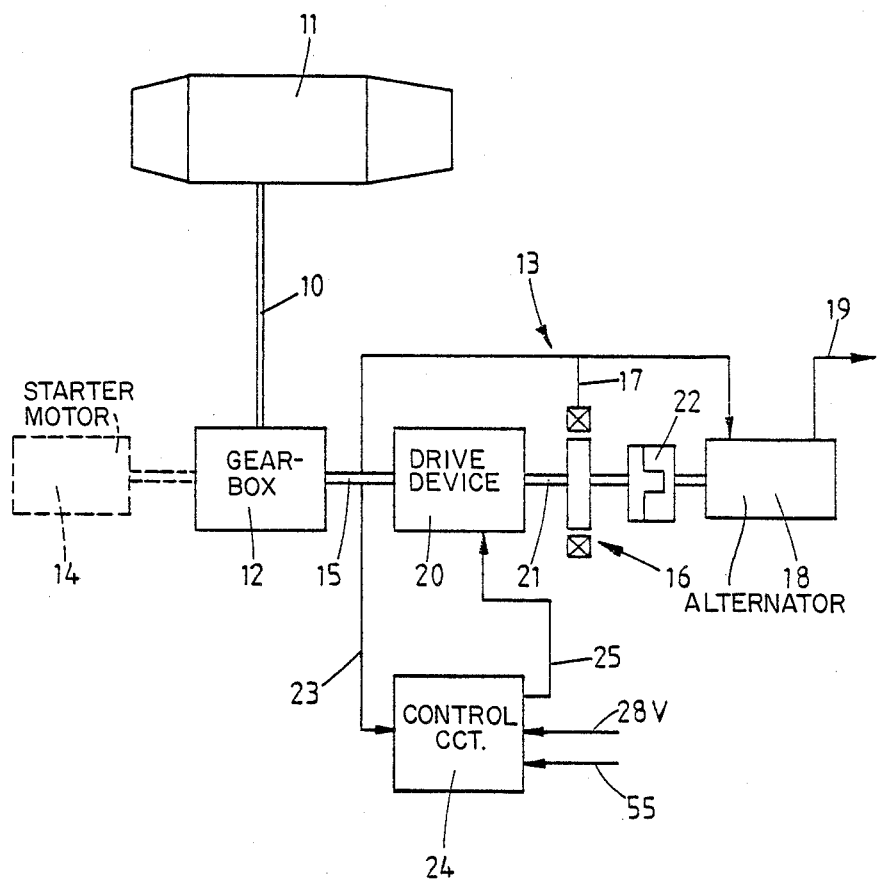

United States Patent [19]

Smith

[11] Patent Number: 4,733,155

[45] Date of Patent: Mar. 22, 1988

[54] SPEED CONTROL UNIT FOR AN AIRCRAFT GENERATOR

[75] Inventor: Sidney B. Smith, Adeyfield, England

[73] Assignee: Lucas Industries Public Limited Company, Great Britain

[21] Appl. No.: 909,488

[22] Filed: Sep. 19, 1986

[30] Foreign Application Priority Data

Oct. 11, 1985 [GB] United Kingdom ................ 8525096

[51] Int. Cl.$^4$ ............................................. H02P 15/00
[52] U.S. Cl. ........................................ 322/10; 322/29; 322/40
[58] Field of Search ................ 322/10, 11, 29, 32, 322/42, 43, 40, 4; 307/8

[56] References Cited

U.S. PATENT DOCUMENTS

| | | | |
|---|---|---|---|
| 4,278,928 | 7/1981 | Griffiths et al. | 322/29 |
| 4,439,720 | 3/1984 | Georges | 322/40 X |
| 4,572,961 | 2/1986 | Borger | 322/40 X |

Primary Examiner—R. J. Hickey
Attorney, Agent, or Firm—Andrus, Sceales, Starke & Sawall

[57] ABSTRACT

A speed control unit for an aircraft generator includes a continuously variable gear ratio drive device through which the generator is driven by a shaft of the engine and which is responsive to an error signal indicative of a difference between desired and sensed generator speeds. A control circuit prevents the error signal from being applied to the drive device until a predetermined speed of the generator is reached and a ramp generating circuit increases the rise time of the error signal after the generator has reached the predetermined speed.

5 Claims, 3 Drawing Figures

SPEED CONTROL UNIT FOR AN AIRCRAFT GENERATOR

This invention relates to speed control units for aircraft electric generators. It is known, for example from U.S. Pat. No. 4,278,928, to provide an electric generator arrangement for use in an aircraft. The generator arrangement includes a drive unit which provides a step up in speed and also includes a speed control which maintains the generator rotor at a constant speed over a wide range of input speeds. When the input speed is low the constant speed drive unit therefore has its highest output/input gear ratio. An input shaft of the drive unit is commonly coupled to a shaft of an engine of the aircraft through an auxiliary gearbox which also provides a connection for a starter for the engine. During engine starting, therefore, the engine starter is required to drive the generator arrangement in addition to the engine. The load imposed by the generator arrangement is a substantial proportion of the total load on the starter. Moreover, because of the initial low engine speed the drive unit would tend to move to its maximum gear ratio and impose an excessively high torque load on the starter. In the above patent it is proposed to reduce the starter torque load by causing the speed control of the drive to remain at a minimum speed position until a predetermined level of generator rotor speed is reached. It is a disadvantage of that arrangement that the aforesaid predetermined speed is substantially below the required final speed of the generator rotor, so that when the predetermined speed is reached the speed control of the drive unit moves instantly to a position which selects maximum speed, thereby imposing a shock load on the engine starter and on its transmission to the generator arrangement. Additionally the engine starter must be sized to accommodate the maximum torque of the shock load, and this may impose an unacceptable weight and size penalty.

It is an object of the present invention to provide a speed control unit or an aircraft generator in which the foregoing disadvantages are reduced.

According to the invention a speed control unit for an aircraft generator comprises a continuously variable ratio drive device, means for sensing the speed of an output shaft of said device, means for generating an error signal responsive to a difference between a sensed speed and a desired speed of said output shaft, control means responsive to said error signal for varying the ratio of the input and output speeds of said drive device, and means for delaying application of said error signal to said drive device until said output shaft has reached to a predetermined speed, said speed control also including a circuit for increasing the rise time of said error signal after said predetermined speed has been reached.

Figure 2:
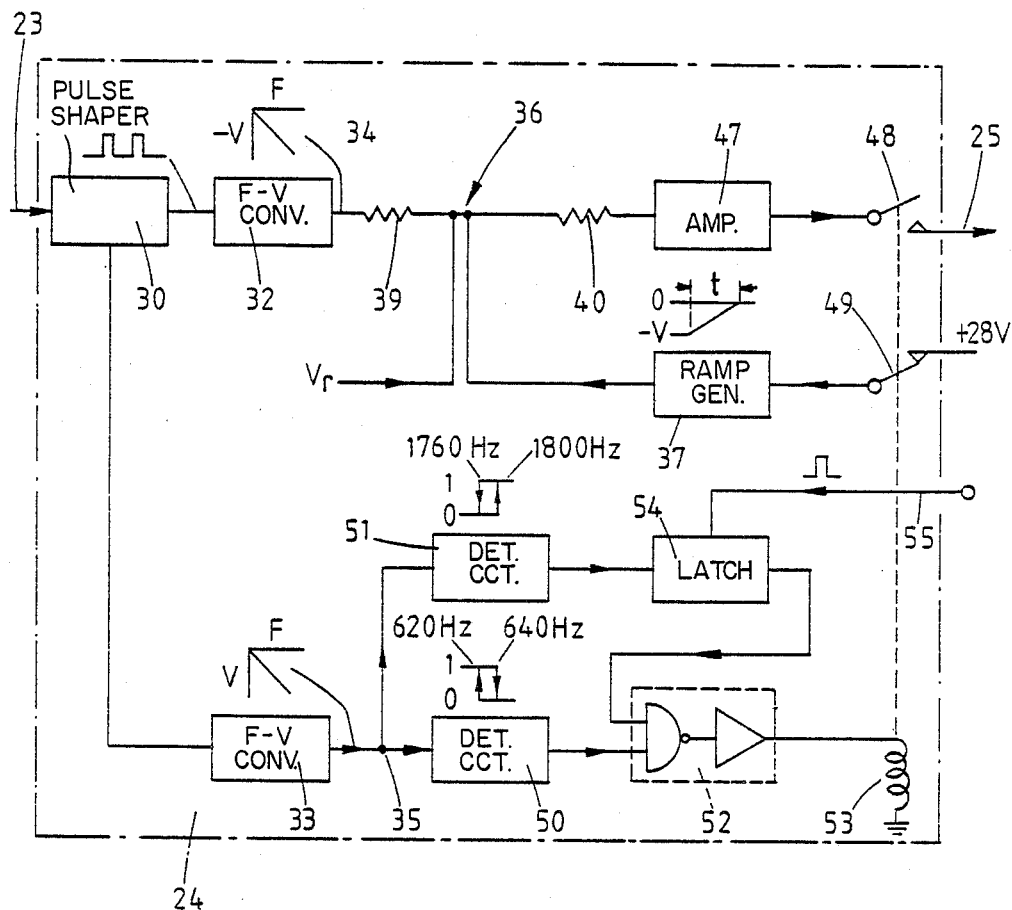
Figure 3:
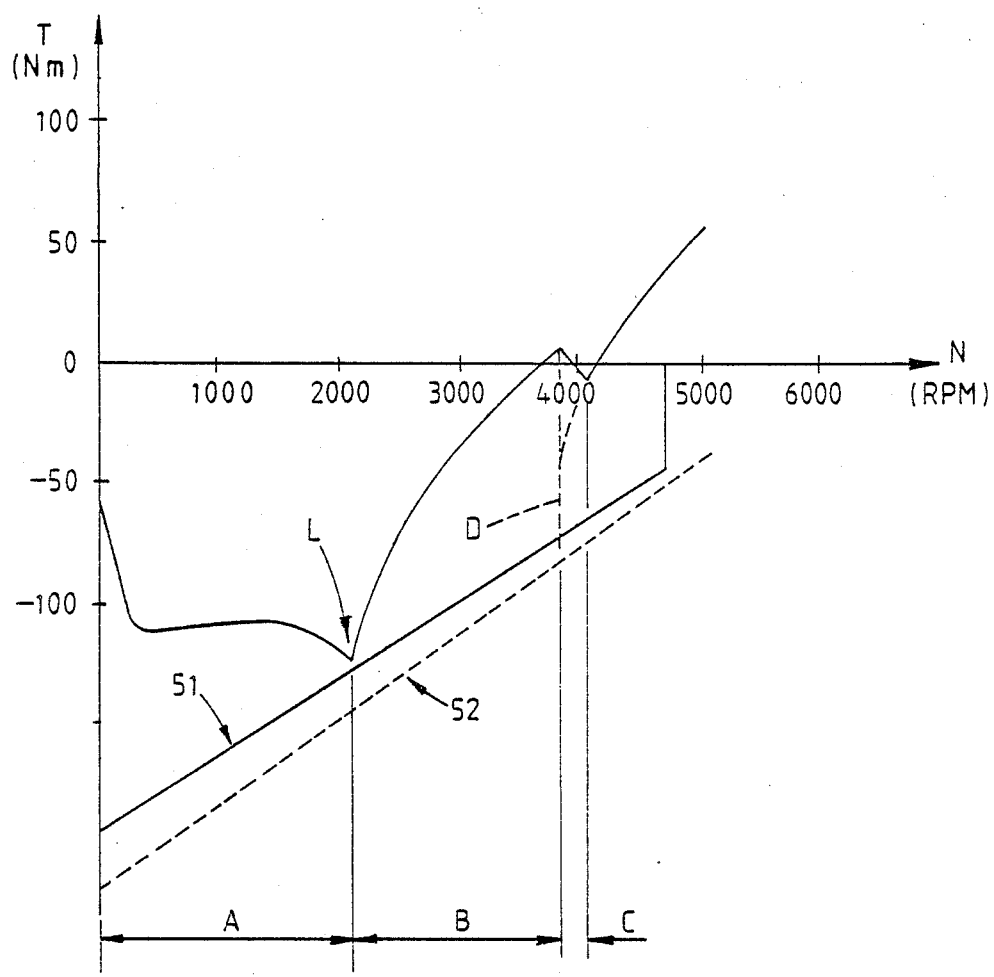

An embodiment of the invention will now be described by way of example only and with reference to the accompanying drawings in which:

FIG. 1 is a diagram of a gas turbine engine and an associated electric generator arrangement, FIG. 2 is a diagram of a control circuit forming part of FIG. 1, and FIG. 3 is a graph of torque against speed at a power take-off shaft of the engine.

As shown in FIG. 1 a power take-off shaft 10 is drivingly coupled to a high pressure shaft of a gas turbine engine 11. An auxiliary gearbox 12 is driven by the shaft 10 and provides a drive to a generator arrangement 13 and to other auxiliary equipment (not shown) such as hydraulic pumps.

A starter motor 14 for the engine 11 is permanently or selectively coupled to the engine 11 through the gearbox 12 and shaft 10. The motor 14 may be regarded as directly coupled to the shaft 10 and rotating at the same speed as the engine high pressure shaft.

An input shaft 15 for the generator arrangement 13 is driven from the gearbox 12 and drives a continuously variable ratio drive device 20 of the type described in U.S. Pat. No. 4,278,928, incorporated herein by reference. An output shaft 21 of the unit 20 drives a permanent magnet alternator 16 whose output is applied on a line 17 to provide excitation for a brushless main alternator 18 of a known type. The output of the main alternator 18 is provided on lines 19. The rotors of the alternators 16, 18 are coupled through an over-running clutch 22 which is such that drive may be applied from the device 20 to the alternator 18, but not in the reverse direction.

The frequency of the output from the alternator 16 corresponds to the speed of the shaft 15, and therefore to the speed of the rotor of the main alternator 18, when the clutch 22 is not over-running. This speed signal is supplied on a line 23 to a control circuit 24 which provides a speed error signal on a line 25 to the drive device 20.

The circuit 24 is shown in more detail in FIG. 2 and includes a pulse-shaping circuit 30 responsive to the signals on line 23. Output pulses from the circuit 30 are supplied to frequency to voltage converters 32, 33 which provides, on respective lines 34, 35 voltage signals $-V$ whose magnitude is negatively proportional to the frequency F of the speed signal on line 23. The signal on line 34 is applied through a resistor 39 to a summing junction 36. A reference voltage Vr which is proportional to the desired speed of the rotor of the alternator 18 provides another input to the summing junction 36, and a further input to the junction 36 is supplied from a ramp generator circuit 37 which, in the presence of a 28 volt biasing signal on a line 38 maintains an output signal which is equal in magnitude and opposite in sign to the voltage Vr.

The junction 36 is connected through a resistor 40 to an amplifier 47. The output of the amplifier 47 is connected to the line 25 through relay contacts 48, the contacts 48 being ganged with contacts 49 between the 28 volt supply and the line 38, so that when the ramp generator 37 is biased to oppose the voltage Vr, the line 25 is also isolated from the control circuit 24.

The speed signal $-V$ on line 35 is applied to a detector circuit 50 which provides a high level signal if the signal frequency on line 23 falls below 620 Hz and a low level signal if this frequency rises above 640 Hz. The signal on line 35 is also applied to a further detector circuit 51 which provides a high level signal if the frequency on line 23 exceeds 1800 Hz and a low signal if that frequency falls below 1760 Hz. Signals from the detector circuits 50, 51 are applied to a NOR logic circuit 52 which is responsive to a high level signal from either of the circuits 50, 51 to de-energise an electromagnetic actuator 53 for the contacts 48, 49 and allow them to move to the position shown in the drawing, in which no signal is applied on the line 25 to the drive device 20. A high level signal from the circuit 51 is indicative of an over-speed condition of the shaft 15, and hence of the alternator 18 and operates a latching circuit 54 to maintain the contacts 48, 49 in the operating position shown until a reset signal is applied on a line 55.

During engine starting, when the frequency of the signal on line 23 is below 640 Hz the relay contacts 48, 49 are in the operating position shown and the output signal from the ramp generator 37 is biased to a constant low level, so that the sum of the reference voltage VR and the voltage from the ramp generator 37 will be zero. The signal from the junction 36 to the amplifier 47 will indicate that the alternators 16, 18 are over speed. This speed error signal from amplifier 47 is nevertheless isolated from the drive 20. As soon as the frequency on line 23 exceeds 640 Hz the contacts 48, 49 are operated to remove the bias from the ramp generator 37 and to apply a signal on line 25. The rise in the ramp voltage from the generator 37 gradually allows the full value of the reference voltage Vr to be applied to the junction 36, and a progressively increasing speed error signal to be applied on line 25. The drive device 20 is thereby progressively changed from a speed-reducing condition to a speed-increasing condition, this latter condition being maintained until the input to the amplifier 47 indicates that the desired and sensed speeds are equal.

A frequency of 640 Hz on the line 23 corresponds to a speed of 3850 RPM of the shaft 10. FIG. 3 shows a graph of torque T at the shaft 10 plotted against the speed N of that shaft. Negative values correspond to torque loads from the engine 11, gearbox 12 and generator arrangement 13, and positive values correspond to input torque from the engine 11. Negative torque values thus correspond to load on the starter 14 (FIG. 1). The portion A of the graph shows the torque load from initial starting to a point L at which the engine 11 lights. Increasing torque output from the engine 11 reduces the torque load over portion B, up to a speed of 3850 of the shaft 10. Above this speed the relay 48, 49, 53 (FIG. 2) operates and the gear ratio of the drive 20 progressively increases over the ramp time C of the generator 37. Though the increasing gear ratio increases the torque load on the starter 14 this load increase is gradual and at the end of the ramp time C the torque from the engine 11 again increases to exceed the loads imposed on it.

A dotted portion D of the graph shows the effect on torque load if the drive device 20 were suddenly allowed to assume control at 3850 RPM, without control by the ramp generator 37. It will be seen that a high torque load is suddenly applied, which would result in a shock load on the starter 14, gearbox 12 and shaft 10 and might cause the engine to stall at that point. The line S1 shows the torque/speed characteristics of a typical starter 14. With the ramp control of the present invention it is necessary only that the characteristic S1 should enclose the torque curve at the point L, since the load substantially decreases thereafter. In the absence of ramp control it will be seen that the starter 14 must have a torque characteristic at least as great as S2, and in practice substantially greater to avoid interruption by the shock load D. This latter condition would require a starter of considerably increased size and weight. Engine starters are commonly designed to cut out at ground idle speed of the engine, this speed being typically, as in the present example, 4700 RPM. It will be seen from FIG. 3 that at this speed the torque supplied by the engine 11 is not itself sufficient to accommodate the shock load D, so that merely delaying operation of the drive device 20 until ground idle speed has been reached will not suffice.

I claim:

1. A speed control unit for an aircraft generator, comprising a continuously variable ratio drive device, means for sensing the speed of an output shaft of said drive device, and a control circuit for generating an error signal responsive to a difference between a sensed speed and a desired speed of said output shaft, said drive device being responsive to said error signal for varying the ratio of the input and output speeds of said drive device to maintain said output speed substantially constant, said control circuit including means for delaying application of said error signal to said drive device until said output shaft has reached a predetermined speed, and a circuit for increasing the rise time of said error signal after said predetermined speed has been reached.

2. A control unit as claimed in claim 1 in which said circuit for increasing the rise time of said error signal includes a ramp voltage generator and means for modifying said error signal in accordance with the ramp voltage.

3. A control unit as claimed in claim 2 which includes a first switching device responsive to said predetermined speed for energising said ramp voltage generator.

4. A control unit as claimed in claim 3 in which said control circuit includes means for generating a voltage corresponding to said sensed speed, means for generating a reference voltage corresponding to said desired speed and means for providing a voltage signal equal in magnitude and opposite in sign to said reference voltage when said shaft is below said predetermined speed.

5. A control unit as claimed in claim 3 or claim 4 in which said means for delaying application of said error signal to said drive device comprises a second switching device operable with said first switching device at said predetermined speed.

* * * * *